United States Patent
Paulsen et al.

(10) Patent No.: US 10,756,344 B2
(45) Date of Patent: Aug. 25, 2020

(54) PRECURSOR AND METHOD FOR PREPARING NI BASED LI TRANSITION METAL OXIDE CATHODES FOR RECHARGEABLE BATTERIES

(71) Applicants: Umicore, Brussels (BE); Umicore Korea Ltd., Chungnam (KR)

(72) Inventors: Jens Paulsen, Daejeon (KR); JiHye Kim, Cheonan (KR); Jin-Doo Oh, Cheonan (KR); Jing Zhang, Cheonan (KR)

(73) Assignees: Umicore, Brussels (BE); Umicore Korea Ltd., Chungnam (KR)

( * ) Notice: Subject to any disclaimer, the term of this patent is extended or adjusted under 35 U.S.C. 154(b) by 0 days.

(21) Appl. No.: 15/757,016

(22) PCT Filed: Aug. 25, 2016

(86) PCT No.: PCT/IB2016/055062
§ 371 (c)(1),
(2) Date: Mar. 2, 2018

(87) PCT Pub. No.: WO2017/042654
PCT Pub. Date: Mar. 16, 2017

(65) Prior Publication Data
US 2018/0351174 A1    Dec. 6, 2018

(30) Foreign Application Priority Data
Sep. 8, 2015 (EP) ..................... 15184205

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC ................ H01M 4/525; H01M 4/505; H01M 2004/028; H01M 4/131; C01G 53/50;
(Continued)

(56) References Cited

U.S. PATENT DOCUMENTS 6,040,090 A    3/2000  Sunagawa et al.
6,660,432 B2  12/2003  Paulsen
(Continued)

FOREIGN PATENT DOCUMENTS

CN    101616870 A    12/2009
CN    103392251 A    11/2013
(Continued)

OTHER PUBLICATIONS

PCT/IB2016055062_Search_Report, dated Apr. 13 2018.
(Continued)

*Primary Examiner* — Andrew J. Oyer
(74) *Attorney, Agent, or Firm* — NK Patent Law

(57) ABSTRACT

A crystalline precursor compound is described for manufacturing a lithium transition metal based oxide powder usable as an active positive electrode material in lithium-ion batteries, the precursor having a general formula $Li_{1-a}$ (($Ni_z$ ($Ni_{1/2}$ $Mn_{1/2}$)y $Co_x$)$_{1-k}$ $A_k$)$_{1+a}$ $O_2$, wherein $x+y+z=1$, $0.1 \leq x \leq 0.4$, $0.25 \leq z \leq 0.55$, A is a dopant, $0 \leq k \leq 0.1$, and $0.04 \leq a \leq 0.50$, wherein the precursor has a crystalline size L expressed in nm, with $77-(67*z) \leq L \leq 97-(67*z)$. Also a method is described for manufacturing a positive electrode material having a general formula $Li_{1-a'}$(($Ni_z$ ($Ni_{1/2}$ $Mn_{1/2}$)y, $Co_x$)$_{1-k}$ $A_k$)$_{1-a'}$ $O_2$, wherein $x+y+z=1$, $0.1 \leq x \leq 0.4$, $0.25 \leq z \leq 0.55$, A is a dopant, $0 \leq k \leq 0.1$, and $0.01 \leq a' \leq 0.10$ by
(Continued)

sintering the crystalline precursor compound in an oxidizing atmosphere at a temperature T between 800 and 1000° C., for a time t between 6 and 36 hrs.

11 Claims, 9 Drawing Sheets

(51) Int. Cl.
- *H01M 4/131* (2010.01)
- *H01M 4/02* (2006.01)
- *H01M 4/505* (2010.01)
- *C01G 51/00* (2006.01)

(52) U.S. Cl.
CPC ...... *C01P 2002/50* (2013.01); *C01P 2002/52* (2013.01); *C01P 2002/72* (2013.01); *C01P 2006/40* (2013.01); *H01M 4/131* (2013.01); *H01M 2004/028* (2013.01)

(58) Field of Classification Search
CPC .............. C01P 2006/40; C01P 2002/72; C01P 2002/50; C01P 2002/52
See application file for complete search history.

(56) References Cited

U.S. PATENT DOCUMENTS

| | | | |
|---|---|---|---|
| 7,648,693 | B2 | 1/2010 | Paulsen |
| 8,673,170 | B2 | 3/2014 | Levasseur |
| 2002/0110518 | A1 | 8/2002 | Okuda et al. |
| 2006/0233696 | A1* | 10/2006 | Paulsen ............... C01G 53/006 423/594.4 |
| 2009/0309063 | A1 | 12/2009 | Paulsen |
| 2014/0054495 | A1 | 2/2014 | Paulsen et al. |
| 2014/0329147 | A1 | 11/2014 | Mitsumoto et al. |
| 2015/0010824 | A1 | 1/2015 | Sun |

FOREIGN PATENT DOCUMENTS

| | | | |
|---|---|---|---|
| EP | 0872450 | A1 | 10/1998 |
| JP | 2002175808 | A | 6/2002 |
| JP | 2007280723 | A | 10/2007 |
| JP | 2012014851 | A | 1/2012 |
| JP | 2015050755 | A | 3/2015 |
| KR | 20070109878 | A | 11/2007 |
| KR | 20130116315 | A | 10/2013 |
| TW | 201042804 | A | 12/2010 |
| TW | 201248981 | A | 12/2012 |
| WO | 2014142281 | A1 | 9/2014 |
| WO | 2016148096 | A1 | 9/2016 |

OTHER PUBLICATIONS

Taiwan_IPO_Search_Report, dated Apr. 20, 2018.
Dahn, Jeff, Solid State Ionics, vol. 44 (1990) pp. 87-97.
Dhzuku, et al., "Electrochemistry and Structural Chemistry of LiNiO2 for 4 Volt Secondary Lithium Cells", J. Electrochem. Soc., vol. 140 (1993) p. 1862.
EPO, Supplementary European Search Report for Patent Application No. EP 16 84 3751, dated Mar. 7, 2019.
CNIPA; Search Report for Chinese Patent Application No. 201680050631.1 dated Jun. 19, 2020, 16 pages.

* cited by examiner

PRECURSOR AND METHOD FOR PREPARING NI BASED LI TRANSITION METAL OXIDE CATHODES FOR RECHARGEABLE BATTERIES

This application is a National Stage application of International Application No. PCT/IB2016/055062, filed Aug. 25, 2016. This application also claims priority to European Application No. EP15184205.1, filed Sep. 8, 2015.

TECHNICAL FIELD AND BACKGROUND

This invention relates to a precursor of and a method to prepare high-Ni "NMC" cathode powdery material at large scale and at low cost. By "NMC" we refer to lithium-nickel-manganese-cobalt-oxide. The high-Ni NMC powder can be used as a cathode active material in Li-ion rechargeable batteries. Batteries containing the cathode materials of the invention yield better performances, such as a higher cycle stability and a low content of soluble base.

Currently rechargeable Li-ion batteries start penetrating the "large" rechargeable battery market. Here, "large batteries" refers to applications such as automotive batteries, as well as stationary power stations. These large stationary or automotive batteries are much larger than previous dominating batteries for portable applications, like cylindrical cells for notebooks or polymer cells for smartphones. Therefore there are fundamentally different requirements for the "large battery" cathode materials, not only performance-wise, but also from the point of resource scarcity. Previously the majority of rechargeable lithium batteries used $LiCoO_2$ (LCO) as cathode material. $LiCoO_2$ is not sustainable for large batteries due to limited cobalt resources—as already today about 30% of the earth's available cobalt is used for batteries, according to the Cobalt Development Institute. The situation is less critical for the so-called NMC cathode materials. Examples are "442" and "532" cathode materials; 442 generally referring to $Li_{1+x}M_{1-x}O_2$ with x=0.05 and $M=Ni_{0.4}Mn_{0.4}Co_{0.2}$; and 532 generally referring to $LiMO_2$ with $M=Ni_{0.5}Mn_{0.3}Co_{0.2}$. The NMC cathode materials contain less cobalt since it is replaced by nickel and manganese. Since nickel and manganese are cheaper than cobalt and relatively more abundant, NMC potentially replaces $LiCoO_2$ in large batteries. Other candidates as olivines ($LiFePO_4$) are less competitive because of the much lower energy density compared to NMC.

A NMC cathode material can roughly be understood as a solid state solution of $LiCoO_2$, $LiNi_{0.5}Mn_{0.5}O_2$ and $LiNiO_2$. In $LiNi_{0.5}Mn_{0.5}O_2$ Ni is divalent, in $LiNiO_2$ Ni is trivalent. At 4.3 V the nominal capacity for $LiCoO_2$ and $LiNi_{0.5}Mn_{0.5}O_2$ is about 160 mAh/g, against 220 mAh/g for $LiNiO_2$. The reversible capacity of any NMC compound can be roughly estimated from these given capacities. For example NMC 622 can be understood as 0.2 $LiCoO_2$+0.4 $LiNi_{0.5}Mn_{0.5}O_2$+0.4 $LiNiO_2$. Thus the expected capacity equals 0.2×160+0.4×160+0.4×220=184 mAh/g. The capacity increases with "Ni excess" where "Ni excess" is the fraction of 3-valent Ni; in NMC622 the Ni excess is 0.4 (if we assume lithium stoichiometry with Li:(Ni+Mn+Co)=1.0). Obviously the capacity increases with Ni excess, so that at the same voltage, Ni-excess NMC possesses a higher energy density than LCO, which means less weight or volume of cathode material is required for a certain energy demand when using Ni-excess NMC instead of LCO. Additionally due to the lower price of nickel and manganese—compared to cobalt—the cost of cathode per unit of delivered energy is much reduced. Thus, the higher energy density and lower cost of Ni-excess NMC—by contrast to LCO—is more preferred in the "large battery" market.

A simple and cheap manufacturing process of NMC cathode material is required for a large-scale application. Such a typical process—which we call direct sintering—is the firing of a blend of a mixed metal precursor (for example $M(OH)_2$ precursor) and a lithium precursor (for example $Li_2CO_3$) in trays, in a continuous manner. Trays with blends are continuously fed into a furnace, and during the movement through the furnace the reaction towards the final sintered $LiMO_2$ proceeds. The firing cost depends strongly on the thru-put of the firing process. The faster the trays move across the furnace (referred to as the "firing time") and the more blend the trays carry (referred to as the "tray load") the higher the thru-put of the furnace is. A furnace has a high investment cost, therefore, if the thru-put is small, the furnace depreciation significantly contributes to the total process cost. In order to achieve a cheap product, a high thru-put is thus desired.

As the capacity of NMC material increases with Ni excess, "Ni-excess" NMC cathode materials, like NMC 532 and NMC 622, possess a higher capacity in batteries than with less Ni, as for example NMC 111 (being $LiMO_2$ with $M=Ni_{1/3}Mn_{1/3}Co_{1/3}$, Ni excess=0). However, the production becomes more and more difficult with increasing Ni content. As an example—very high Ni-excess cathode materials like NCA (which is $LiNi_{0.8}Co_{0.15}Al_{0.5}O_2$) cannot be prepared in air or using $Li_2CO_3$ as Li precursor. Because of the low thermodynamic stability of Li in high-Ni material, the preparation occurs in $CO_2$ free oxidizing gas (typically oxygen) and as lithium precursor LiOH is used instead of the cheaper $Li_2CO_3$. Contrary to this, the low Ni NMC111 can easily be prepared in normal air and using a $Li_2CO_3$ precursor. As Ni increases NMC tends to have a low air stability, and it is more difficult to obtain a cathode with low content of soluble base. The concept of "soluble base" is more explicitly discussed in U.S. Pat. No. 7,648,693.

The preparation of NMC 532 (Ni excess=0.2) is more difficult than NMC 111, but NMC 532 can be processed at large scale through the cheap and simple "direct sintering" solid state reaction under air. The lithium source is preferably chosen as $Li_2CO_3$, as in the production of NMC 111, due to its low price. This detailed preparation procedure of direct sintering will be discussed in the description below. The manufacturing cost of NMC 532 cathode material is relatively higher than NMC 111 but much cheaper than for NCA that has a Ni excess of 0.8.

The energy density of NMC 532 is much higher than NMC 111, thus, NMC 532 is very competitive to take the place of LCO in a cheap production process at large scale.

Another promising Ni-excess NMC is NMC 622, whose Ni excess is 0.4, being much higher than the Ni excess in NMC 532, so that the capacity of NMC 622 is still higher than that of NMC 532, but at the same time, the production is more difficult than NMC 532, and definitely harder than NMC111. Even if it might still be feasible to produce NMC 622 by direct sintering, as in the case of NMC 532 and NMC 111, however, it is difficult to prepare NMC 622 at large scale at low cost in an efficient way. The problems of large production mainly originate from the high soluble base content in the final NMC product. The soluble base refers to the surface impurities like $Li_2CO_3$ and LiOH, and in this case the $Li_2CO_3$ impurity is of most concern. As discussed in U.S. Pat. No. 7,648,693, these bases may come from unreacted reagents of lithium sources, usually $Li_2CO_3$ or $LiOH.H_2O$, where $LiOH.H_2O$ normally contains 1 wt % $Li_2CO_3$ impurity. These bases may also come from the mixed transition metal hydroxides that are used as transition metal source in the production. A mixed transition metal hydroxide is usually obtained by co-precipitation of transition metal sulfates and an industrial grade base such as NaOH. The base contains a $CO_3^{2-}$ impurity in the form of $Na_2CO_3$. In the case of high Ni-excess NMC, like NMC 622, after sintering at high temperature, the carbonate compounds remain on the surface of the final product. The soluble base content can be measured by a technique called pH titration, as discussed in U.S. Pat. No. 7,648,693.

The presence of soluble base content in the final NMC material could cause a serious gas generation in full cells, which is usually called "bulging" in full cell tests. Serious gas generation or bulging issues will result in a bad cycling life of the battery together with safety concerns. Therefore, in order to use high Ni-excess NMC material for large battery applications, an effective and cheap processing method is necessary that avoids such high soluble base content. Additionally it is observed that the deterioration of cyclability in NMC material is related to the above-mentioned presence of $Li_2CO_3$.

A process to prepare NMC 622 with low $Li_2CO_3$ soluble base—as is disclosed in US2015-010824—runs as follows: $LiOH.H_2O$ with low $Li_2CO_3$ impurity as Li source, is blended with mixed transition metal hydroxide at target composition, and sintered at high temperature under an air atmosphere. In this process, the base content of such high Ni-excess NMC final product (like NMC 622) is much reduced, but the manufacturing cost is relatively high due to the higher price of pure $LiOH.H_2O$ compared to a $Li_2CO_3$ precursor. This conflicts with the low cost benefit of substituting LCO by NMC material, where, as said before, a cheap and simple production process is essential to replace LCO.

U.S. Pat. No. 7,648,693 proposes a "split" method, where the direct sintering is conducted in two steps: a first lithiation at relatively low temperature, like 700° C., and a second step of sintering at a higher temperature. In this patent, a large-scale preparation of $LiMO_2$ with $M=Ni_{4/15}(Mn_{1/2}Ni_{1/2})_{8/15}Co_{0.2}$ is achieved with a final product that is almost free of soluble base. The cycling stability of that NMC material is also improved. The "split" method is thus a potential way to prepare NMC 622 free of soluble base and at low cost. However, it has been found that this "split" method is not usable for the large scale production of NMC 622, with lithium carbonate as Li-precursor, as in U.S. Pat. No. 7,648,693 excessive amounts of preheated air have to be pumped through the reactor. Practically this processing method is limited for lower Ni-excess NMC, such as NMC 532.

Therefore, in order to replace LCO by high Ni-excess NMC—like NMC 622—for the "large battery" market, it is the aim of the present invention to provide a cheap and efficient manufacturing process, where the high Ni-excess NMC can be produced at low cost, and without resulting in a too high soluble base content.

SUMMARY

Viewed from a first aspect, the invention can provide the following product embodiments:

Embodiment 1

A crystalline precursor compound for manufacturing a lithium transition metal based oxide powder usable as an active positive electrode material in lithium-ion batteries, the precursor having a general formula $Li_{1-a}$ $((Ni_z(Ni_{1/2}Mn_{1/2})_y Co_x)_{1-k} A_k)_{1+a} O_2$, wherein $x+y+z=1$, $0.1 \leq x \leq 0.4$, $0.25 \leq z \leq 0.55$, A is a dopant, $0 \leq k \leq 0.1$, and $0.04 \leq a \leq 0.50$, wherein the precursor has a crystalline size L expressed in nm, with $77-(67*z) \leq L \leq 97-(67*z)$. The crystalline size L is calculated by the Williamson-Hall (W-H) method, described below. Dopant A may be selected from the group of elements consisting of Al, Ti, Mg, B, Ca, Mn, Cr, V, Fe, Zr, S, F, P and Bi. These dopants are commonly added to NMC compounds, with a maximum of 10 mol %. The Co content may be further limited: $0.1 \leq x \leq 0.25$, in order to lower cost. The value of a may also be specified as $0.10 \leq a \leq 0.25$ to have a good equilibrium between the first and second sintering step in the method embodiments below.

Embodiment 2

The crystalline precursor compound has a $Li_2CO_3$ content <0.3 wt %, or even <0.2 wt %.

Embodiment 3

For the crystalline precursor compound: $0.40 \leq z \leq 0.55$ and $0.10 \leq a \leq 0.25$.

Embodiment 4

The crystalline precursor compound having a general formula $Li_{1-a}$ $[Ni_{0.4} (Ni_{1/2} Mn_{1/2})_{0.4} Co_{0.2}]_{1+a} O_2$, with $0.10 \leq a \leq 0.20$ and $55 \leq L \leq 65$.

Embodiment 5

The crystalline precursor compound having a general formula $Li_{1-a}$ $[Ni_{0.55} (Ni_{1/2}Mn_{1/2})_{0.3} Co_{0.15}]_{1+a} O_2$ with $0.15 \leq a \leq 0.25$ and $45 \leq L \leq 55$.

Each of the individual product embodiments described hereabove can be combined with one or more of the product embodiments described before it.

Viewed from a second aspect, the invention can provide the following method embodiments:

Embodiment 6

A method for preparing a positive electrode material having a general formula $Li_{1+a'}M_{1-a'}O_2$, with $M=(Ni_z(Ni_{1/2}Mn_{1/2})\ Co_x)_{1-k}A_k$, wherein $x+y+z=1$, $0.1 \leq x \leq 0.4$, $0.25 \leq z \leq 0.55$, A is a dopant, $0 \leq k \leq 0.1$, and $0.01 \leq a' \leq 0.10$, comprising the steps of:

- providing a M-based precursor prepared from the co-precipitation of metal sulphates with a base;
- mixing the M-based precursor with $Li_2CO_3$, thereby obtaining a first mixture, whereby the Li to transition metal ratio in the first mixture is between 0.50 and 0.96,
- sintering the first mixture in an oxidizing atmosphere at a temperature between 860 and 930° C., for a time between 8 and 36 hrs, thereby obtaining a lithium deficient precursor powder,
- mixing the lithium deficient precursor powder with either one of LiOH and $LiOH.H_2O$, thereby obtaining a second mixture,
- sintering the second mixture in an oxidizing atmosphere at a temperature between 800 and 1000° C., for a time between 6 and 36 hrs. Dopant A may be selected from the group of elements consisting of Al, Ti, Mg, B, Ca, Mn, Cr, V, Fe, Zr, S, F, P and Bi.

Embodiment 7

The method wherein the lithium deficient precursor powder may be according to the first aspect of the invention.

Embodiment 8

In the method, the Li to transition metal ratio in the first mixture is between 0.65 and 0.82.

Embodiment 9

In the method, $0.40 \leq z \leq 0.55$, and the Li to transition metal ratio in the first mixture is $((2-z)/1.88) \pm 0.05$.

Embodiment 10

In the method, the first mixture is sintered at a temperature between 880 and 920° C.

Embodiment 11

In the method, the second mixture is sintered at a temperature between 820 and 860° C., for a time between 8 and 12 hrs.

Each of the individual method embodiments described hereabove can be combined with one or more of the method embodiments described before it.

Viewed from a third aspect, the invention can provide the following electrode material embodiments:

Embodiment 12

A positive electrode material having a general formula $Li_{1+a'}((Ni_z(Ni_{1/2} Mn_{1/2})_y Co_x)_{1-k} A_k)_{1-a'} O_2$, wherein $x+y+z=1$, $0.1 \leq x \leq 0.4$, $0.25 \leq z \leq 0.55$, A is a dopant, $0 \leq k \leq 0.1$, and $0.01 \leq a' \leq 0.10$ prepared by sintering the crystalline precursor compound in an oxidizing atmosphere at a temperature T between 800 and 1000° C., for a time t between 6 and 36 hrs.

Embodiment 13

A positive electrode material having a general formula $Li_{1+a'}((Ni_z(Ni_{1/2} Mn_{1/2})_y Co_x)_{1-k} A_k)_{1-a'} O_2$, wherein $x+y+z=1$, $0.1 \leq x \leq 0.4$, $0.25 \leq z \leq 0.55$, A is a dopant, $0 \leq k \leq 0.1$, and $0.01 \leq a' \leq 0.10$, prepared by two successive lithiation reactions, wherein the first lithiation reaction yields the precursor compound described before.

Embodiment 14

A positive electrode material having a general formula $Li_{1+a'}((Ni_z(Ni_{1/2} Mn_{1/2})_y Co_x)_{1-k} A_k)_{1-a'} O_2$, wherein $x+y+z=1$, $0.1 \leq x \leq 0.4$, $0.25 \leq z \leq 0.55$, A is a dopant, $0 \leq k \leq 0.1$, and $0.01 \leq a' \leq 0.10$, prepared by two successive lithiation reactions, wherein the first lithiation reaction yields an intermediate compound that is lithium deficient versus the positive electrode material.

Embodiment 15

The positive electrode material of embodiment 12, having a $Li_2CO_3$ content <0.3 wt %.

Embodiment 16

The positive electrode material of embodiment 12, having a $Li_2CO_3$ content <0.15 wt %.

Viewed from a fourth aspect, the invention can provide the use of the crystalline precursor powder according to the invention for manufacturing a positive electrode material according to the third aspect of the invention. For example, embodiment 17 describes the use of a compound for manufacturing a lithium transition metal based oxide powder usable as an active positive electrode material in lithium-ion batteries, the compound having a general formula $Li_{1-a}((Ni_z (Ni_{1/2} Mn_{1/2})_y Co_x)_{1-k} A_k)_{1+a} O_2$, wherein $x+y+z=1$, $0.1 \leq x < 0.4$, $0.30 \leq z < 0.55$, A is a dopant, $0 \leq k < 0.1$, and $0.05 \leq a < 0.50$, wherein the compound has a crystalline size L expressed in nm, with $77-(67*z) < L \leq 97-(67*z)$.

DETAILED DESCRIPTION

Figure 1:
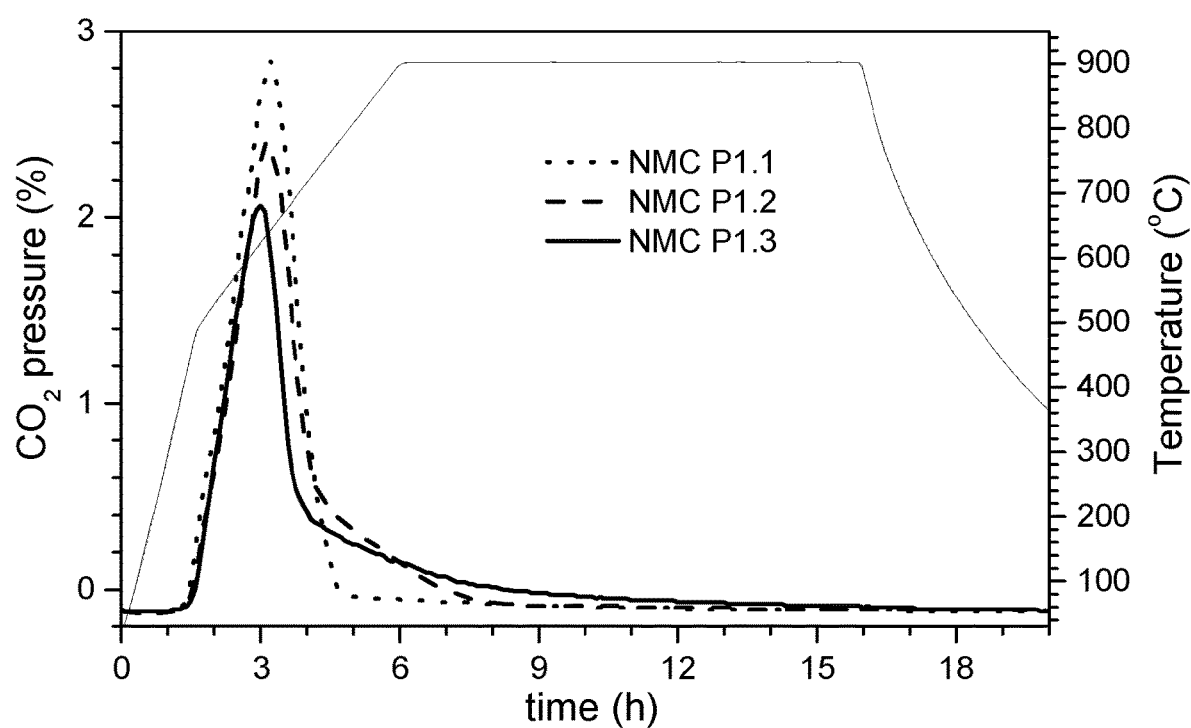
FIG. 1: $CO_2$— and temperature profile during the large-scale direct sintering of NMC.

Manufacturing Procedure of NMC Through Direct Sintering Method

The following description gives the standard manufacturing procedure of NMC powders through direct sintering, which is the solid state reaction between $Li_2CO_3$ and a mixed transition metal source, usually mixed metal hydroxide $M(OH)_2$ or oxyhydroxide MOOH (M=Ni, Mn and Co), but not limited to these hydroxides. In a typical configuration, the direct sintering method comprises the following steps:

1) Blending of the mixture of precursors: lithium carbonate and mixed nickel-manganese-cobalt oxyhydroxide MOOH (wherein M has the "target" transition metal composition of the final product) are homogenously blended in a Henschel Mixer® for 30 mins by a dry powder mixing process.

2) Sintering the blends in trays: the powder mixture is loaded in trays, where the tray loading weight is less than 2 kg, and sintered at 900° C. for 10 hours under dry air atmosphere in a chamber furnace. The dry air is continuously pumped into the equipment at a flow rate of 20 L/hr.

3) Post-treatment: after sintering, the sintered cake is crushed, classified and sieved so as to obtain a non-agglomerate NMC powder.

The invention observes that the direct sintering method is applicable for large-scale manufacturing of low or non Ni-excess NMC material (having a Ni-excess<0.25) without too much presence of soluble base. "Explanatory example 1" below shows that NMC powders with low or no Ni-excess can easily be prepared by direct sintering. However, as the Ni excess increases, the direct sintering becomes more difficult. It is observed that the high Ni-excess NMC (having a Ni-excess≥0.25) requires long sintering times and a low tray load to be successfully manufactured through the direct firing method. Thus high Ni excess NMC has a low thru-put and therefore the direct sintering production is not available to process the high Ni-excess NMC material, such as NMC 622, with a high quality at an acceptable low cost.

"Explanatory example 2" investigates further how Ni excess influences the ease of preparation: NMC materials with a Ni excess as 0.4, 0.55 and 0.7 are produced at a small scale (10 g) through the direct sintering method. The pH titration results of these three samples show that the NMC material with a Ni excess up to 0.7 is not stable enough to be produced in air, since the lithium carbonate content of the final product is dramatically increased. As gas phase transport matters (to get $CO_2$ away from the reaction) it is generally easier to complete a reaction at small scale, thus if 10 g does not give low base the approach will fail at large scale. It follows that NMC with high Ni excess of for example 0.7 cannot at all be prepared in air using $Li_2CO_3$ as lithium source. The other two NMC material with the composition of Li $Ni_{0.55}(Mn_{1/2}Ni_{1/2})_{0.3}Co_{0.15}O_2$ and $LiNi_{0.4}(Mn_{1/2}Ni_{1/2})_{0.4}Co_{0.2}O_2$ have a much lower amount of lithium carbonate, so that the NMC materials with a Ni excess as 0.4 and 0.55 could be produced by the direct sintering method, but it is limited to a small thru-put. Accordingly, in order to apply high Ni-excess NMC to large battery market, an alternative processing method is necessary for large-scale production.

The "Explanatory example 3" presents a NMC 622 material (Ni excess=0.4)—produced at high thru-put by the above-mentioned direct sintering method. The analysis of this material shows a high content of lithium carbonate and a bad cycle stability. NMC622 cannot be prepared at high quality with high thru-put by direct sintering. In the large-scale manufacturing, NMC 622 requires long sintering times and a low tray load to reduce the presence of soluble base in the final product. This is because as the nickel excess increases the thermodynamic stability decreases, so the equilibrium reaction of lithium carbonate decomposition and NMC formation tends to be pushed backward. Therefore, in the large-scale production the $CO_2$ gas transport kinetics is relatively slow. Only if the tray loading is small and the firing time is increased the reaction is completed and a low $Li_2CO_3$ product is achieved. However, in that case, the thru-put is too low and the manufacturing cost of NMC 622 becomes too high. For even higher Ni-excess NMC, like NMC 811 (being $LiMO_2$ with $M=Ni_{0.7}(Mn_{1/2}Ni_{1/2})_{0.2}Co_{0.1}$), it is impossible to manufacture this product under air atmosphere at a large scale.

This invention provides a precursor to prepare high Ni-excess NMC by a double firing method. Contrary to split firing (the firing is split into two parts, the first being a reaction and the second a sintering, as described in U.S. Pat. No. 7,648,693), the double firing as understood in this invention means there are two distinct lithiation reactions. The idea is to achieve a balance between the low cost and low soluble base content by optimizing the amount of lithium carbonate and lithium hydroxide precursors. The main procedure includes two steps of sintering. The intention of the first sintering is the preparation of a Li-deficient sintered precursor which allows to prepare NMC with high Ni excess like NMC622 at high tray thru-put and low cost. The mixed transition metal source (like mixed hydroxide) is blended with lithium carbonate with a Li-deficient stoichiometry, meaning that the ratio of Li:M in $LiMO_2$ is less than 1. Then in the second sintering, the lithium deficient precursor is blended with lithium hydroxide in order to correct the ratio of Li:M to the final target composition. In an embodiment, the NMC 622 with low soluble base content is obtained at large scale production through this double firing method which uses a lithium deficient sintered precursor during the $2^{nd}$ firing. The thru-put is much higher compared to the direct sintering method. Thus, the use of a lithium deficient sintered precursor and applying the double firing method in this invention is a low cost and efficient manufacturing way to high Ni-excess NMC.

This invention observes that the properties of the lithium deficient sintered product strongly influence the performance of the final product. The soluble base content of the final product is strongly related to the conditions during $1^{st}$ firing to prepare the lithium deficient sintered precursor. For example, the $1^{st}$ cook firing temperature, sinter time, tray loading and the ratio of lithium to mixed transition metal can be chosen appropriately to obtain a final product of high quality and with a high thru-put. It will be shown that fortunately the appropriate selection of a multitude of parameters can be checked by one single parameter: the crystalline size of the product of the first sintering step.

During the preparation of the lithium deficient sintered precursor—i.e. during the first sintering, the blending molar ratio of lithium carbonate to mixed transition metal hydroxide (Li:M ratio, the composition of M corresponding to the metal composition in the final product) may be adjusted to avoid too much soluble base appearing in the intermediate product. In a practical embodiment of the invention, the Li:M ratio may be adjusted according to the optimized sintering temperature (linked to the desired crystallinity) and the preference of shorter firing times.

During the first sintering, the firing time may also be optimized to guarantee the reaction processing forward to the maximum extent. In an embodiment, the total firing time including heating and cooling is set in the range of 12 to 20 hours for the large-scale production of NMC 622. After the first sintering, a lithium deficient sintered precursor is obtained. The precursor has a low content of $Li_2CO_3$ impurity. In an embodiment, it is determined by pH titration that the $Li_2CO_3$ content is <0.3 wt %, preferably <0.15 wt %. The intermediate product is a single phase lithium transition metal oxide having an ordered or disordered rocksalt crystal structure. The composition is believed to be $Li_{1-a}M_{1+a}O_2$. In an embodiment the Li:M stoichiometric ratio is 0.5 to 0.90, preferably 0.60 to 0.82. The metal composition is $Li_{1-a}((Ni_z(Ni_{1/2}Mn_{1/2})_y Co_x)_{1-k} A_k)_{1+a} O_2$, wherein x+y+z=1, $0.1 \le x \le 0.4$, $0.30 \le z \le 0.55$, A is a dopant, $0 \le k \le 0.1$, and $0.05 \le a \le 0.50$. The precursor has a crystalline size L expressed in nm that is dependent on the Ni excess content z, with $77-67*z \le L \le 97-67*z$.

The lithium deficient sintered precursor is used as precursor to prepare a cathode material for rechargeable lithium batteries. The cathode material is a well crystallized lithium transition metal oxide having a higher Li:M ratio than the intermediate powder. The cathode material is prepared by a second sintering process: a blend of the intermediate product and LiOH or $LiOH.H_2O$ is fired in an oxidizing gas like air, dry air, $CO_2$ free air or oxygen. As in a direct sintering process 1 mol Li is needed in the form of LiOH in the prior art, in the double firing process according to the invention less than 0.5 mol Li is to be supplied in the form of LiOH.

Description of Test Conditions: Coin Cell Test

The final NMC materials produced by the double firing method according to the invention are electrochemically tested at a small scale in a coin cell. The details are as follows: a half-cell (coin cell) is assembled by placing a separator (from Celgard) between the positive electrode and a piece of lithium metal as a negative electrode, and dropping an electrolyte of 1M $LiPF_6$ in EC/DMC (1:2) between separator and electrodes. All the cell tests in the present invention follow the same procedure shown in Table 1. The C-rate is defined as 160 mAh/g. For example, 0.1 C means that the cell will be charged or discharged in 10 hour. "E-Curr" and "V" stands for the end current and cut-off voltage, respectively. At the first cycle, the DQ0.1 C (discharge capacity of the first cycle at a rate of 0.1 C) and IRRQ (irreversible capacity) are determined. The rate performance can be calculated from the subsequent five cycles. The performance of cycle stability is obtained from cycle #7 to #35. The capacity fading at 0.1 C is represented by "Qfade0.1 C (%/100)". With DQ7 and DQ34 referring to the discharge capacity of cycle #7 and #34 respectively, the "Qfade0.1 C (%/100)" could be obtained through the following formula: (1−(DQ34/DQ7))/27*100*100. This is similar for the capacity fading at 1 C, which is noted as "Qfade1 C (%/100)". With DQ8 and DQ35 referring to the discharge capacity of cycle #8 and #35 respectively, the "Qfade1C (%/100)" could be obtained through the following formula: (1−(DQ35/DQ8))/27*100*100.

TABLE 1 coin cell testing procedure

| Cycle # | Charge | | | Discharge | | |
|---|---|---|---|---|---|---|
| | C-rate | E-Curr | V | C-rate | E-Curr | V |
| 1 | 0.10 | — | 4.3 | 0.10 | — | 3.0 |
| 2 | 0.25 | 0.05 C | 4.3 | 0.20 | — | 3.0 |
| 3 | 0.25 | 0.05 C | 4.3 | 0.50 | — | 3.0 |
| 4 | 0.25 | 0.05 C | 4.3 | 1.00 | — | 3.0 |
| 5 | 0.25 | 0.05 C | 4.3 | 2.00 | — | 3.0 |
| 6 | 0.25 | 0.05 C | 4.3 | 3.00 | — | 3.0 |
| 7 | 0.25 | 0.1 C | 4.5 | 0.10 | — | 3.0 |
| 8 | 0.25 | 0.1 C | 4.5 | 1.00 | — | 3.0 |
| 9-33 | 0.50 | 0.1 C | 4.5 | 1.00 | — | 3.0 |
| 34 | 0.25 | 0.1 C | 4.5 | 0.10 | — | 3.0 |
| 35 | 0.25 | 0.1 C | 4.5 | 1.00 | — | 3.0 |

Description of Test Conditions: Ex-Situ Coin Cell Test

The final NMC materials produced by the double firing method according to the invention are ex-situ tested through X-ray diffraction after been electrochemically charged at a small scale in a coin cell. The coin cell are made as described above. The prepared cells are electrochemically charged to 12.5% SOC (state-of-charge) at a rate of 0.1 C, where 1 C means 160 mAh/g charged in 1 hr. Then the coin cell is disassembled and the cathode electrode is tested by X-ray diffraction.

Description of Test Conditions: pH Titration Test

The soluble base content is a material surface property that can be quantitatively measured by the analysis of reaction products between the surface and water, as is explained in U.S. Pat. No. 7,648,693. If powder is immersed into water a surface reaction occurs. During the reaction, the pH of the water increases (as basic compounds dissolve) and the base is quantified by a pH titration. The result of the titration is the "soluble base content" (SBC). The content of soluble base can be measured as follows: 2.5 g of powder is immersed into 100 ml of deionized water and stirred for 10 mins in a sealed glass flask. After stirring to dissolve the base, the suspension of powder in water is filtered to get a clear solution. Then 90 mL of the clear solution is titrated by logging the pH profile during addition of 0.1 M HCl at a rate of 0.5 ml/min until the pH reaches 3 under stirring. A reference voltage profile is obtained by titrating suitable mixtures of LiOH and $Li_2CO_3$ dissolved in low concentration in DI water. In almost all cases two distinct plateaus are observed. The upper plateau with endpoint γ1 (in mL) between pH 8~9 is $OH^-/H_2O$ followed by $CO_3^{2-}/HCO_3^-$, the lower plateau with endpoint γ2 (in mL) between pH 4~6 is $HCO^{3-}/H_2CO_3$. The inflection point between the first and second plateau γ1 as well as the inflection point after the second plateau γ2 are obtained from the corresponding minima of the derivative $d_{pH}/d_{Vol}$ of the pH profile. The second inflection point generally is near to pH 4.7. Results are then expressed in LiOH and $Li_2CO_3$ weight percent as follows:

$$Li_2CO_3 \; wt\% = \frac{73.8909}{1000} \times (\gamma_2 - \gamma_1);$$

$$LiOH \; wt\% = \frac{23.9483}{1000} \times (2 \times \gamma_1 - \gamma_2).$$

Description of Test Conditions: X-Ray Diffraction Test

The current invention observes that the crystalline properties of the lithium deficient sintered precursor are correlated with the soluble base content in the final NMC product and further to the cycle stability of these NMC materials based coin cells. When the crystallinity of the lithium deficient sintered precursor is either too high or too low according to the invention, either the soluble base content will be high in the final product, the reversible electrochemical capacity will be insufficient or the cycling performance is bad. In this invention, the crystallinity of NMC material is evaluated by determining the crystalline size and lattice strain from the X-ray diffraction pattern. The crystalline size, as a derivation from perfect crystallinity, leads to a broadening of a diffraction peak. It is the same case for strain, which is defined as a deformation of unit cell divided by its length, represented by Δd/d. The non-uniform lattice strain can cause the systematic shifts of atoms and lead to a peak broadening. Thus, through the analysis of the width of individual diffraction peaks, the crystalline size and lattice strain could be obtained.

In "Acta Metallurgica, 1, 22-31 (1953)", Williamson and Hall proposed a method to extract the information on crystalline size and strain from the integral width of diffraction peaks. This method is based on the approximate relationship between Bragg angle (θ) and peak broadening arising from crystalline size and lattice strain, with the following formula:

$$\beta \cos\theta = C\epsilon \sin\theta + \frac{K\lambda}{L},$$

where β represents the integral width of peak, ε is the lattice strain, L is the crystalline size, λ is the radiation wavelength, and C and K are constants, often taken as 4 and 0.9, respectively. By looking at the product of integral width (β) and cos θ as a function of sin θ, the lattice strain and crystalline size can be estimated from the slope and intercept of a fitting line for this formula, respectively. The integral width (β) is the width of a rectangle having the same height (maximum intensity) and area (integrated intensity) of the selected diffraction peak. The area can be approximately integrated by a trapezoidal rule, and the height can be easily obtained from raw data of the diffraction pattern, thus it is feasible to estimate the integral width of each diffraction peak and further determine the crystalline size and lattice stain by this Williamson-Hall (W-H) method.

In this invention, the (003) and (104) peaks are chosen to calculate the crystalline size and strain. The integral width and Bragg angle of diffraction peak (003) are represented by $\beta_1$ and $\theta_1$, while the integral width and Bragg angle of diffraction peak (104) are represented by $\beta_2$ and $\theta_2$. The crystalline size L and lattice strain E can be obtained from the intercept and slope, by the following formulas:

$$L = \frac{K\lambda}{y_2 - \frac{y_2 - y_1}{x_2 - x_1} \times x_2}$$

$$\varepsilon = \frac{\frac{y_2 - y_1}{x_2 - x_1}}{C}$$

Where the $y_2$ is defined as the product of $\beta_2$ and $\cos \theta_2$, $y_1$ is defined as the product of $\beta_1$ and $\cos \theta_1$. The $x_2$ and $x_1$ are the value of $\sin \theta_2$ and $\sin \theta_1$ respectively.

It is known that the structural model of $Li_{1-a}((Ni_z(Ni_{1/2}Mn_{1/2})_y Co_x)_{1-k} A_k)_{1+a} O_2$ is the $\alpha$-NaFeO$_2$ structure (space group R-3m, no. 166) with Li in 3a sites, Ni, Co, and Mn randomly placed on 3b sites, and oxygen atoms on 6c sites (in general an NMC compound can be represented as $[Li]_{3a}[Ni_xCo_yMn_z]_{3b}[O_2]_{6c}$). The current invention however observes that the lithium deficient sintered precursor has a phenomenon of cation mixing, meaning that there is a high amount of Ni on Li 3a sites (being the sites within the layers predominantly filled by Li atoms). This differentiates our lithium deficient sintered precursor from the common lithium deficient material obtained during charge/discharge. The latter basically has little cation mixing. Generally, the degree of Li/M disorder can be roughly estimated by the intensity ratio of peak (003) (referred to as I003) to I104 (=intensity of peak (104)), as indicated in "J. Electrochem. Soc. 140 (1993) 1862". A large ratio of I003 to I104 means a low degree of Li/M disorder. A systematic study on cation mixing was described by Jeff Dahn in Solid State Ionics 44 (1990) 87-97. U.S. Pat. No. 6,660,432 B2 gives an extended application of this method to evaluate the degree of Li/M disorder on Li-in excess transition metal oxide material. The idea of this method originates from the fact that the intensity I101 of peak (101) is rapidly attenuated while the combinational intensity of peaks (102) and peak (006) (I102 & I006) are enhanced when Ni atoms occupy "Li sites". Thus, a factor R is introduced, which represents the ratio of I102&I006 to I101. In Dahn's paper, it is demonstrated that the R factor increases rapidly as x decreases in $Li_xNi_{2-x}O_2$ material, where 1−x refers to the degree of cation mixing. A formula was deducted to express the relationship between R and x as follows:

$$R = \frac{4}{3} \frac{(1.6 - x)^2}{x^2}$$

So the degree of cation mixing (1−x) is equivalent to R, and can be determined from the R value according to the formula.

In this invention, the two methods here above are used to evaluate the degree of cation mixing of the lithium deficient sintered precursors and the final products based on these precursors. The ratio I003/I104 and the value of R will be discussed below. It is observed that the degree of cation mixing is higher in lithium deficient sintered precursor by contrast to the final product. An explanatory example is also given to describe the cation mixing results in lithium deficient material obtained during charge in a normal battery cycling program, which has a similar composition as the lithium deficient sintered precursor of the present invention, but has a clear difference in cation mixing.

The following examples illustrate the present invention in more detail.

Explanatory Example 1

NMC powder having the formula $Li_{(1+x)}M_{(1-x)}O_2$ with Li:M=1.05:0.95 and M=$Ni_{1/3}Mn_{1/3}Co_{1/3}$ is prepared according to the above-mentioned "Manufacturing procedure of NMC through direct sintering method". This sample is labelled NMC P1.1. Also, NMC powder with the formula $Li_{(1+x)}M_{(1-x)}O_2$ with Li:M=1.01:0.99 and M=$Ni_{0.25}(Ni_{1/2}Mn_{1/2})_{0.54}Co_{0.2}$ is prepared using the same procedure, and is labelled NMC P1.2. Finally, NMC powder with the formula $Li_{(1+x)}M_{(1-x)}O_2$ with Li:M=1.01:0.99 and M=$Ni_{0.45}(Ni_{1/2}Mn_{1/2})_{0.44}Co_{0.11}O_2$ is prepared by the same procedure and is labelled NMC P1.3. During the sintering, the percentage of $CO_2$ pressure in the gas flow exiting from the sintering equipment is measured.

In FIG. 1, the left y-axis presents the percentage of $CO_2$ pressure in the gas flow exiting from the sintering equipment over sintering time, while the right y-axis gives the temperature profile. The $CO_2$ and temperature profiles of the three NMC samples are represented in dot, dash, and solid line, for the NMC 1.1, NMC P1.2 and NMC P1.3 sample respectively, where the NMC P1.3 sample has the largest Ni excess of 0.45 while the NMC P1.1 sample is non Ni-excess and NMC P1.2 sample has a Ni excess of 0.25. All three samples are sintered through the same temperature profile as shown in FIG. 1, however, their $CO_2$ profiles suggest a different behavior during sintering. During sintering, the precursor is considered to react through the following schematic equilibrium reaction, where the MOOH represents a mixed nickel-manganese-cobalt oxy-hydroxide with a target composition M:

$MOOH + Li_2CO_3 \leftrightarrow LiMO_2 + CO_2\uparrow + \frac{1}{2}H_2O\equiv$

Once the sintering temperature is high enough to activate the reaction, the reaction goes fast towards the right direction until an equilibrium point is achieved, where the maximum $CO_2$ partial pressure of the air flow in the sintering equipment is reached. Beyond the equilibrium point, the gas phase limits the reaction rate towards the right direction and as the solid state reaction proceeds the $CO_2$ partial pressure gradually decreases and approaches the initial partial pressure in the air flow as the reaction finalizes. The shape of the $CO_2$ partial pressure curve is related to the presence of $Li_2CO_3$ in the sintered product. A high $CO_2$ partial pressure at the beginning and a fast decrease towards zero indicates that $Li_2CO_3$ is quickly decomposed and the final product will contain a negligible amount of unreacted $Li_2CO_3$ impurity. Otherwise if the $CO_2$ partial pressure does not decrease towards zero but stays above zero for a prolonged time, this indicates that the decomposition of $Li_2CO_3$ evolves at a slow rate. This means that for a given gas flow rate more time is needed to decompose all $Li_2CO_3$ and achieve a final product with low $Li_2CO_3$ impurity. A longer sintering time or lower tray loading is thus beneficial to avoid the presence of lithium carbonate, but this corresponds to a low thru-put which is not acceptable from a cost perspective.

During the sintering of the NMC P1.1 sample, the $CO_2$ partial pressure decreases quickly to a low value, close to the initial partial pressure, which indicates a nearly complete reaction, and lithium carbonate is barely appearing in the NMC P1.1 sample. As to the high Ni excess NMC samples, the $CO_2$ partial pressure of NMC P1.2 slowly goes down during the dwelling time at a temperature of 900° C. and almost goes back to the initial partial pressure after this period of dwelling at high temperature. By contrast to the NMC P1.1 sample, NMC P1.2 needs more time to obtain the desired NMC product, which contains a negligible amount of lithium carbonate. This proves that Ni-excess NMC is harder to manufacture than NMC 111. As to the highest Ni-excess NMC, like the NMC P1.3 sample, it is even more difficult. The $CO_2$ partial pressure of the NMC P1.3 sample is always higher than the values of the previous two samples during sintering, even after 10 hours sintering at the dwelling temperature. This demonstrates that a proper sintering of NMC P1.3 requires more than 10 hours in this case. We also observe that the maximum $CO_2$ pressure obtained at the equilibrium point decreases as the Ni excess increases, indicating that the reaction not only takes more time but also initially proceeds at a lower rate. Therefore, during the production through direct sintering method, high Ni-excess NMC materials need unacceptable long sintering times to avoid an excess of lithium carbonate.

Explanatory Example 2

This example presents three NMC materials prepared using a direct sintering method at a small scale. NMC 622 powder with the formula $LiNi_{0.4}(Ni_{1/2}Mn_{1/2})_{0.4}Co_{0.2}O_2$ is prepared as follows: a 100 g mixture of $Li_2CO_3$ and MOOH with $M=Ni_{0.4}(Ni_{1/2}Mn_{1/2})_{0.4}Co_{0.2}$ is homogeneously blended in a vertical single-shaft mixer by a dry powder mixing process. 10 g of the blended powder is loaded in a crucible and sintered at 700° C. for 48 hours under air atmosphere within a box furnace. The small amount of sample and the long firing time ensure that the final product approaches the thermodynamic equilibrium for the given temperature and gas pressures. After sintering, the powder is grinded and ready for the pH titration test. The above produced sample is labelled NMC P2.1. Secondly, NMC powders with the formula $LiNi_{0.55}(Ni_{1/2}Mn_{1/2})_{0.3}Co_{0.15}O_2$ and NMC 811 $LiNi_{0.7}(Ni_{1/2}Mn_{1/2})_{0.2}Co_{0.1}O_2$ are also prepared through similar steps as above, with an adapted MOOH composition. The produced sample with formula $LiNi_{0.55}(Ni_{1/2}Mn_{1/2})_{0.3}Co_{0.15}O_2$ is named NMC P2.2, while the one with formula $LiNi_{0.7}(Ni_{1/2}Mn_{1/2})_{0.2}Co_{0.1}O_2$ is labelled NMC P2.3.

Figure 2:
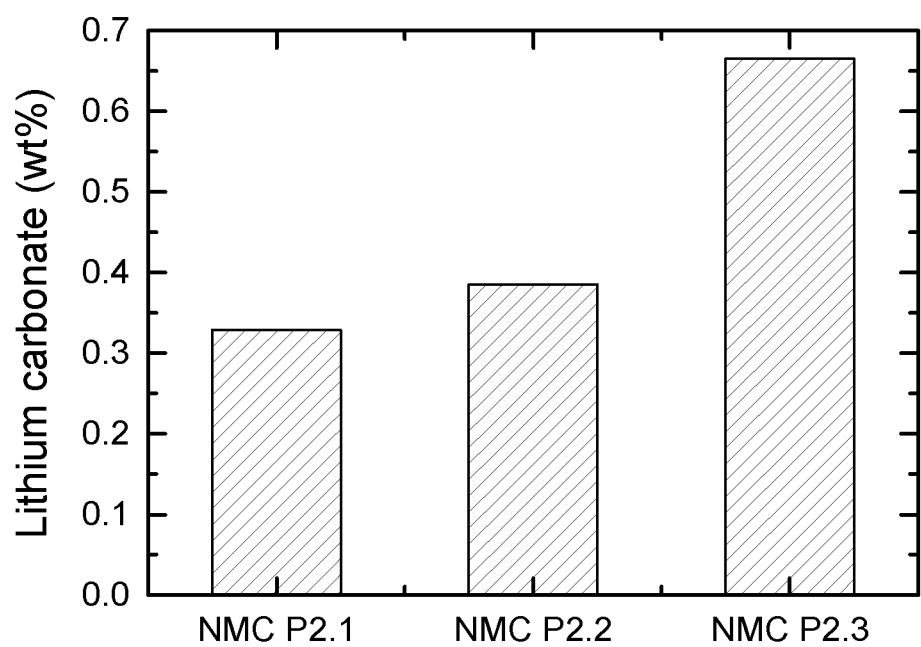
FIG. 2: lithium carbonate content of NMC samples after direct sintering at a small scale.

FIG. 2 presents the pH titration results of these NMC materials, where the weight percentage of lithium carbonate in the final NMC samples is plotted. The three NMC materials have different values of Ni excess: 0.4 for NMC P2.1, 0.55 for NMC P2.2, and 0.7 for NMC P2.3. All the samples are prepared under the same processing conditions. However, the prepared powders have a large distinction in the base content. It is clear that the NMC P2.3 sample has a much higher amount of lithium carbonate than the other two samples. Thus, the NMC P2.3 sample with the very high Ni excess is difficult to be produced with a low base content, even at such a small scale. Therefore NMC 811 is impossible to be efficiently manufactured under an air atmosphere by direct sintering. As to the other two NMC materials, the lithium carbonate contents are quite smaller, and they have the potential to be manufactured under air at a large scale. Their residual lithium carbonate content is however still too high.

Explanatory Example 3

A NMC powder with formula $Li_{1.03}[Ni_{0.4}(Ni_{1/2}Mn_{1/2})_{0.4}Co_{0.2}]_{0.97}O_2$ is prepared according to the above-mentioned "Manufacturing procedure of NMC through direct sintering method", with a sintering temperature of 880° C. and a tray loading of 2 kg. This NMC 622 sample is named NMC P3.1. Table 2 summaries the pH titration and coin cell results of NMC P3.1.

TABLE 2

Performance of example NMC P3.1

| Sample | Example | DQ0.1C (mAh/g) | Qfade0.1C (%/100) | Qfade1C (%/100) | $Li_2CO_3$ (wt %) |
|---|---|---|---|---|---|
| NMC P3.1 | Explanatory example 3 | 175 | 7.69 | 12.17 | 0.72 |

The weight percentage of lithium carbonate in the final NMC P3.1 sample is determined at 0.72 wt %, which is a quite high amount compared to the content of around 0.3 wt % usually measured in NMC 111 or NMC 532 material. Generally, the presence of high soluble base content and high $Li_2CO_3$ in NMC materials deteriorates the cycling performance. The coin cell test evaluates the cycle stability of NMC P3.1 sample based on the capacity fade at 0.1 C and 1 C, which are represented by the "Qfade0.1C" and "Qfade1C" in Table 2. It shows that there is 0.0769% loss of discharge capacity per cycle at 0.1 C after 25 cycles and 0.1217% loss for 1 C. The discharge capacity fading in the coin cell is considered to be too large so that the cycle stability of NMC P3.1 sample is not acceptable for a full cell application. The reason for the high content of lithium carbonate and the bad cycling performance is mainly the short sintering time (10 hours) during the direct sintering process even if the tray load is very low. As discussed in the "Explanatory example 1", the high Ni-excess NMC normally requires very long sinter times to tolerate the slow kinetics of $CO_2$ transportation and instability of high Ni-excess NMC material during high temperature sintering. The sintering time in this example cannot satisfy this requirement so that there is large amount of lithium carbonate impurity and the cycle stability deteriorates. To improve the performance, the direct sintering process needs either long sintering time or small tray load, which is not acceptable in view of the increased costs associated to it.

Example 1

A NMC powder with formula $Li_{1.05}M_{0.95}O_2$ with $M=Ni_{0.4}(Ni_{1/2}Mn_{1/2})_{0.4}Co_{0.2}$ is manufactured at a large-scale (>3 kg per tray) from a lithium deficient sintered precursor through the following steps:

1) $1^{st}$ blending: to obtain a lithium deficient precursor with a composition $Li_{0.85}(Ni_{0.4}(Ni_{1/2}Mn_{1/2})_{0.4}Co_{0.2})_{1.15}O_2$, 5.5 kg of lithium carbonate and a mixed nickel-manganese-cobalt oxyhydroxide are homogenously blended in just proportions in a Henschel Mixer® for 30 mins. The composition can be verified by a standard ICP test.

2) $1^{st}$ sintering: 5 kg of the mixture from the first blending step is sintered at 900° C. for 10 hours under dry air in a pilot-scale equipment. Dry air is continuously pumped into the sintering equipment at a flow of 40 L/min. After sintering, the sintered cake is crushed and ready for the second blending step. The product obtained from this step is the lithium deficient sintered precursor. The composition of this intermediate product is verified by a standard ICP test.

3) 2$^{nd}$ blending: the lithium deficient sintered precursor is blended with 20 mol % LiOH to correct the Li stoichiometry in the intermediate product to the final target composition of Li$_{1.05}$ (Ni$_{0.4}$ (Ni$_{1/2}$ Mn$_{1/2}$)$_{0.4}$Co$_{0.2}$)$_{0.95}$ O$_2$. The blending is done in a Henschel Mixer® for 30 mins.

4) 2$^{nd}$ sintering: The mixture from step 3) is sintered at 850° C. for 10 hours under dry air in a pilot-scale equipment. Dry air is continuously pumped into the sintering equipment at a flow of 40 L/min.

5) Post-treatment: After sintering, the sintered cake is crushed, classified and sieved so as to obtain a non-agglomerate powder.

The above prepared lithium deficient sintered precursor is labelled NMC E1p, and the final NMC sample is labelled NMC E1.

Counterexample 1

A NMC powder having the formula Li$_{1.05}$M$_{0.95}$O$_2$ with M=Ni$_{0.4}$ (N$_{1/2}$ Mn$_{1/2}$)$_{0.4}$Co$_{0.2}$ is manufactured at a large-scale according to the steps in Example 1, except that the lithium deficient sintered precursor has an insufficient crystallinity, as it is prepared at a lower first sintering temperature of 820° C. This NMC sample is labelled NMC C1, the lithium deficient sintered precursor is labelled NMC C1p.

Counterexample 2

A NMC powder having the formula Li$_{1.05}$M$_{0.95}$O$_2$ with M=Ni$_{0.4}$ (Ni$_{1/2}$ Mn$_{1/2}$)$_{0.4}$Co$_{0.2}$ is manufactured at a large-scale according to the steps in Example 1, except that the lithium deficient sintered precursor has an increased crystallite size, as it is prepared at a high first sintering temperature of 950° C. The above-prepared NMC sample is labelled NMC C2, the lithium deficient sintered precursor is labelled NMC C2p.

Performance of Example 1, Counterexample 1 and Counterexample 2

Figure 3:
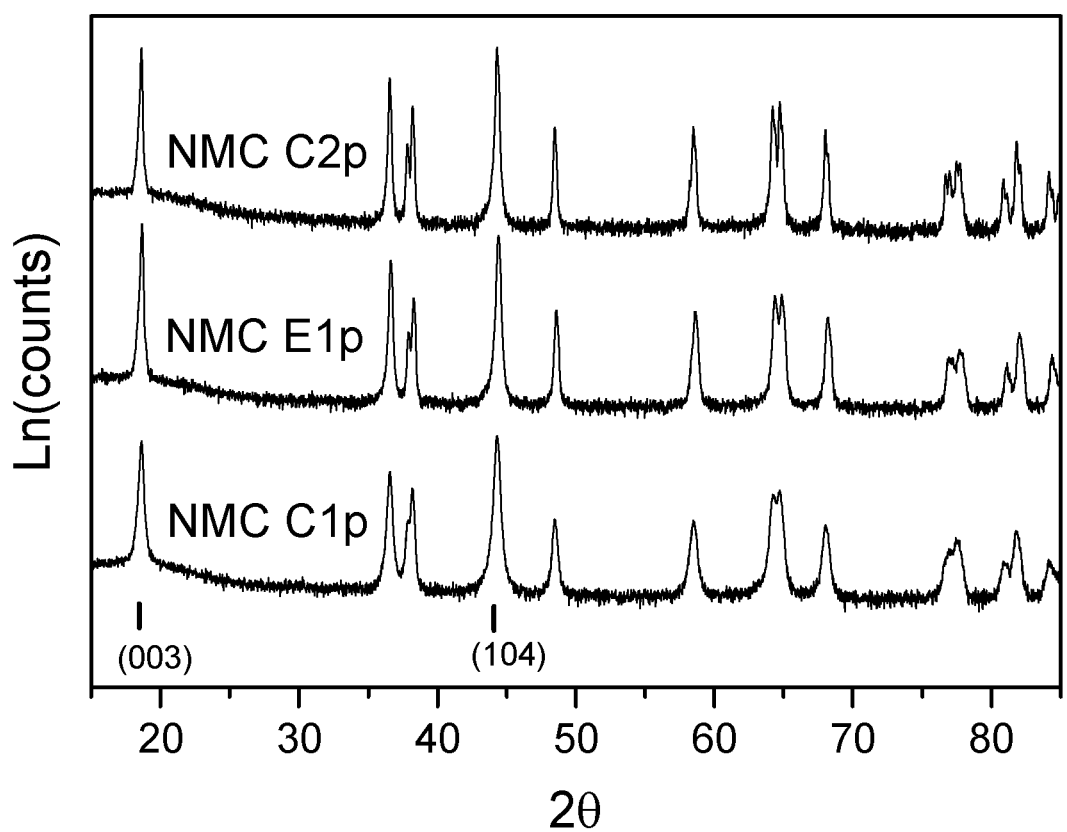
FIG. 3: XRD pattern of the intermediate of NMC 622 samples.

FIG. 3 shows the X-ray diffraction patterns of NMC C1p, NMC C2p and NMC E1p, where the intermediate means the Li-deficient NMC powder obtained after the first sintering (after step 2). The XRD patterns disclose single-phase NMC powders without obvious impurities. In the Figure, the (003) and (104) diffraction peaks are indicated. These two peaks are chosen to calculate the crystalline size and lattice strain with the W-H method.

Figure 4:
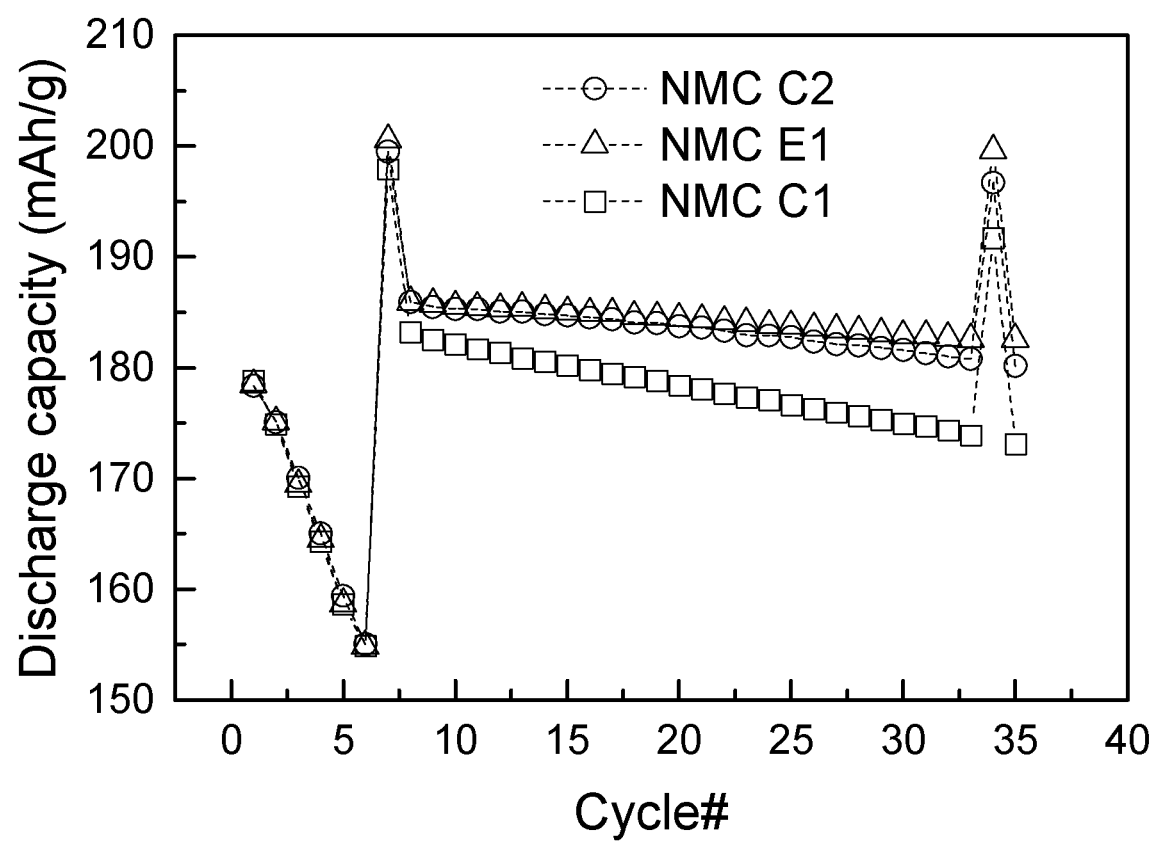
FIG. 4: Coin cell profile of NMC 622 samples.

FIG. 4 shows the coin cell results of the NMC C1, NMC E1 and NMC C2 samples, where the triangle symbol is for NMC E1, the circle symbol is for NMC C2 and the square symbol is for NMC C1. The cyclability of these cells is evaluated by the parameters "Qfade0.1 C (%/100)" and "Qfade1 C (%/100)". The "Qfade0.1 C (%/100)" gives the discharge capacity fading at 0.1 C-rate after cycling, as detailed in Table 1. The "Qfade1 C (%/100)" gives the discharge capacity fading at 1 C-rate after cycling. From the Figure, it can be observed that the NMC E1 has the best cyclability, while NMC C1 has the worst one. Table 3 summarizes the electrochemical performance, crystalline information and soluble base content of the NMC E1, NMC C1 and NMC C2 samples.

TABLE 3

Performance of Ex 1, CE2 and CE3

| Sample | Size* (nm) | DQ0.1C (mAh/g) | Qfade0.1C (%/100) | Qfade1C (%/100) | Li$_2$CO$_3$ (wt %) |
|---|---|---|---|---|---|
| NMC E1 | 62.7 | 178.5 | 1.7 | 6.7 | 0.262 |
| NMC C1 | 39.3 | 178.8 | 11.5 | 20.9 | 0.417 |
| NMC C2 | 72.1 | 178.4 | 5.23 | 11.48 | 0.139 |

*The crystalline size L of intermediate products.

As all the samples are prepared with the double firing method, the sole difference between them is the crystallinity of the lithium deficient sintered precursor used for the 2$^{nd}$ firing. The different sintering conditions during the 1$^{st}$ cook results in a variation of crystalline size and lattice strain of the lithium deficient precursors. For the highest sintering temperature, NMC C2p has a relatively large crystalline size of 72.1 nm. When decreasing the sintering temperature by 50° C., NMC E1p is obtained with a smaller crystalline size of 62.7 nm. When the sintering temperature goes further down by 80° C., the crystalline size of NMC C1p is 39.3 nm. According to the invention, for z=0.4, 50.2≤L≤70.2. It is clear that the crystalline size of the intermediate decreases when lowering the sintering temperature, however, the lithium carbonate content in the final NMC products follows the inverse trend. The lithium carbonate content is reduced for the highest first sintering temperature to 0.139 wt % in NMC C2. Accordingly, in order to reduce the lithium carbonate content in the final product, it is necessary to obtain a lithium deficient sintered precursor with high crystallinity.

As explained in "Explanatory example 3", the cycle stability is strongly effected by the presence of lithium carbonate in the cathode NMC material. A high lithium carbonate content in the NMC powder leads to a bad cyclability in the NMC-based battery. This is shown in the case of the NMC E1 and NMC C1 samples. The NMC E1 sample has the lowest amount of lithium carbonate, and the coin cell test of NMC E1 presents the best cyclability, where the capacity fading after 25 cycles, represented by "Qfade0.1 C (%/100)" and "Qfade1 C (%/100)", are quite smaller than the data of NMC C1. However, the results of the NMC C2 sample are unexpected in view of the obtained lithium carbonate content. Even though the lithium carbonate content in NMC C2 is the lowest, the cycle stability is much worse than for NMC E1. It can be observed that the "Qfade0.1 C (%/100)" and "Qfade1C (%/100)" of NMC C2 are larger than those of NMC E1. The reason for such poor cyclability is the too high crystallinity of the lithium deficient sintered precursor. The high crystallinity is caused by the too high sinter temperature leading to over-sintering.

The final NMC product made from such over-sintered intermediate has a bad cyclability result in the coin cell test. Thus, there is an optimum range of crystalline size for the intermediate for obtaining high Ni-excess NMC powder (Ni-excess=0.4) having good cyclability in a battery. When the crystalline size of the lithium deficient sintered precursor is too high, like in the case of NMC C2p, the cycle stability is negatively affected. When the crystalline size of the intermediate is too low, like in the case of NMC C1p, the lithium carbonate content in the final product is too high to obtain a good cyclability. Thus, in the double firing method of high Ni-excess NMC (Ni-excess=0.4) according to the invention, the crystalline size of the lithium deficient sintered precursor is crucial to obtain a good cycling performance of the final product.

Figure 5:
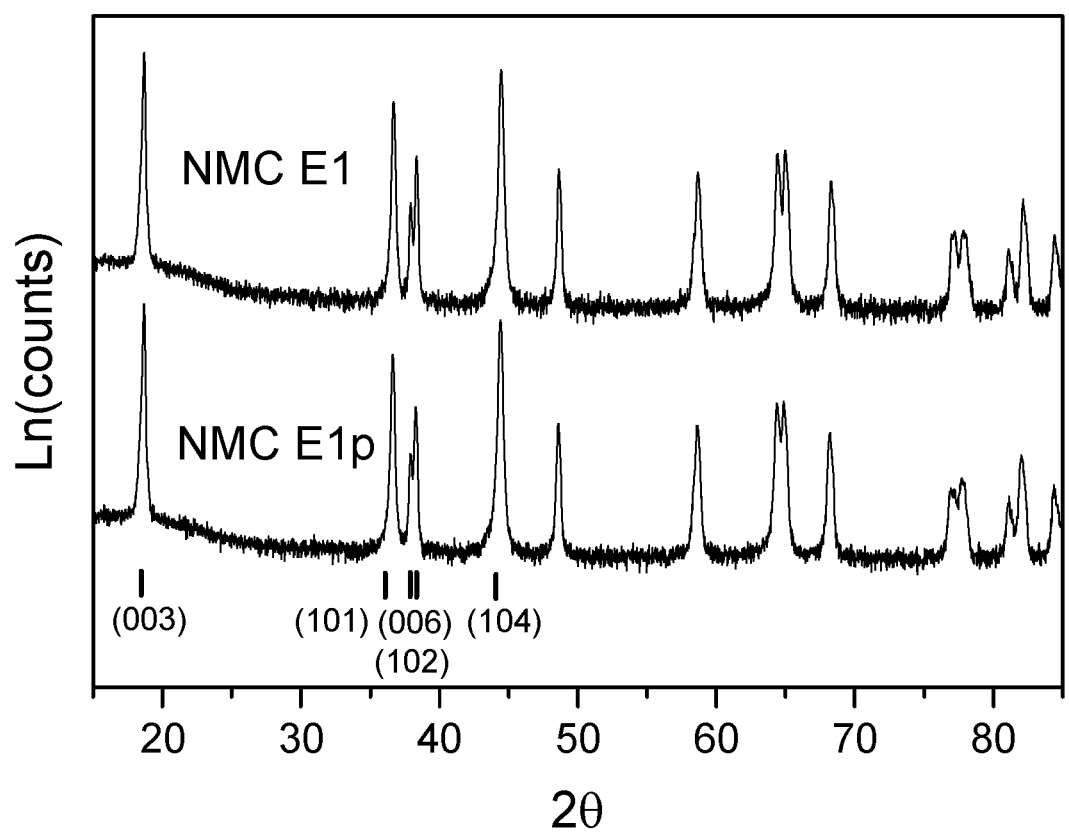
FIG. 5: XRD pattern of the intermediate and final product of NMC 622 samples.

FIG. 5 shows the XRD patterns of NMC E1p and NMC E1. The Bragg peaks (003), (101), (104) and doublet peak (006, 102) are indicated. Based on the intensity of these peaks, Table 4 summarizes the ratio of I003/I104 and R factor of the NMC E1p and NMC E1 samples.

TABLE 4

I003/I104 ratio and R factor of Ex 1.

| Sample | I003/I104 | R factor |
|---|---|---|
| NMC E1p | 0.81 | 0.64 |
| NMC E1 | 1.02 | 0.42 |

As described above, the ratio of I003/I104 reflects the degree of Li to transition metal disorder. A large value of I003/I104 indicates a small degree of distortion. The precursor sample NMC E1p has a small I003/I104 ratio, which means there is more cation mixing in NMC E1p and more Ni on the Li sites. The same observation can be made when comparing the R factor. The lithium deficient sintered precursor has a higher R factor by contrast to the final product. As discussed in Dahn's paper mentioned above, a high R factor means a high disordering of Li and transition metals. Thus, the higher value of R in NMC E1p confirms that there is a higher percentage of Ni on Li sites in the lithium deficient sintered precursor.

Explanatory Example 4

Figure 6:
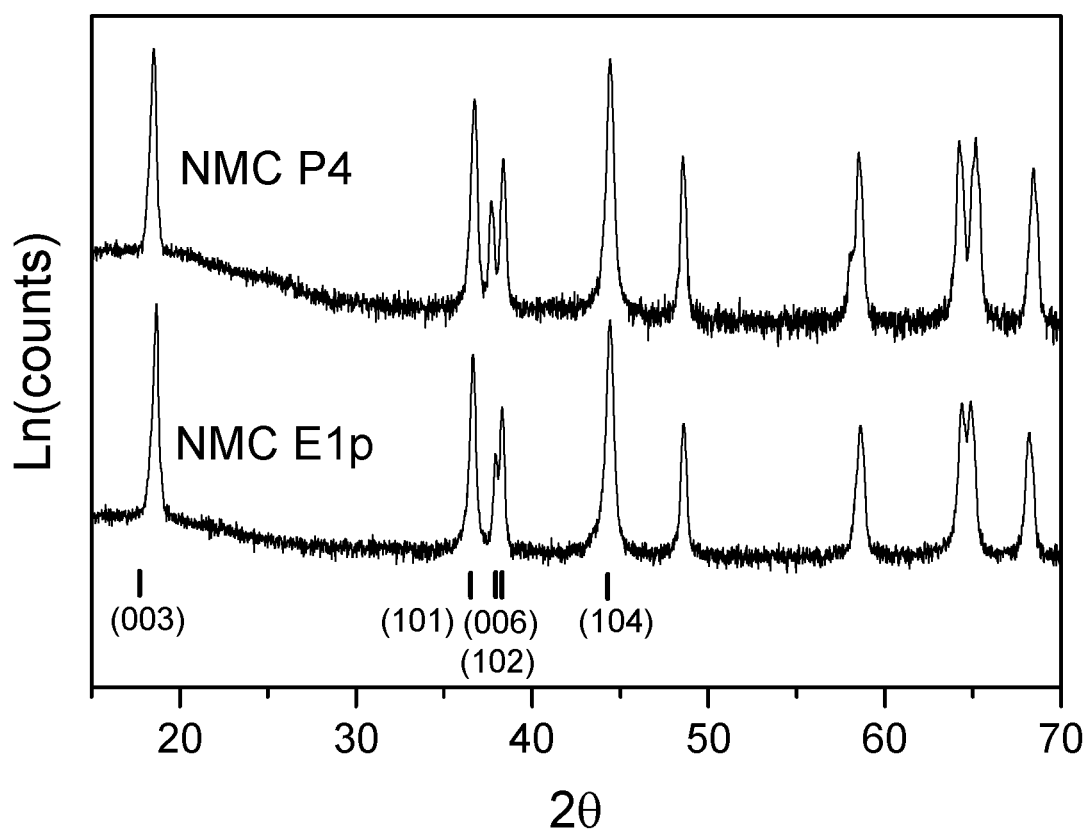
FIG. 6: XRD pattern of the intermediate and charged final product of NMC 622 samples.

This example demonstrates that lithium deficient NMC 622 material, which is obtained during charge/discharge has little cation mixing, at least much less than the lithium deficient sintered precursor of the invention. NMC 622 powder having the formula $Li_{1.05}M_{0.95}O_2$ with $M=Ni_{0.4}(Ni_{1/2}Mn_{1/2})_{0.4}Co_{0.2}$ is prepared according to the procedure in Example 1. Following the "Description of test conditions: ex-situ coin cell test", this sample is charged to the composition of $Li_{0.875}MO_2$ with $M=Ni_{0.4}(Ni_{1/2}Mn_{1/2})_{0.4}Co_{0.2}$, and the sample is labelled NMC P4. FIG. 6 shows the XRD pattern of NMC E1p and NMC P4. The Bragg peaks (103), (101), (104) and doublet peak (006, 102) are indicated. Based on the intensity of these peaks, Table 5 summarizes the ratio of I003/I104 and R factor of NMC E1p and NMC P4 samples. The XRD pattern of these two samples are also analyzed through Rietveld refinement, the results such as the percentage of Ni on Li sites, cell volume and $R_{bragg}$, are summarized in Table 5. $R_{bragg}$ represents the reliability of the refinement. A small $R_{bragg}$ means a good fitting performance. The $R_{bragg}$ of samples E1p and P4 are 2.133 and 3.235 respectively, which values are small enough to confirm that the refinement on these two samples is reliable.

TABLE 5

I003/I104 ratio and R factor of NMC E1p and NMC P4, and percentage of Ni on Li sites, cell volume, $R_{bragg}$ by Rietveld refinement.

| Sample | I003/I104 | R factor | Ni on Li (%) | Cell vol (Å$^3$) | $R_{bragg}$ |
|---|---|---|---|---|---|
| NMC E1p | 0.81 | 0.64 | 10.45 | 102.086 | 2.133 |
| NMC P4 | 1.02 | 0.43 | 2.35 | 100.333 | 3.235 |

From the Table, it can be seen that the NMC E1p sample has a smaller I003/I104 and larger R factor by contrast to the NMC P4 sample. This indicates there is more cation mixing in NMC E1p. When comparing with NMC E1, NMC P4 has the same ratio of I003/I104 and similar R factor. Accordingly, the lithium deficient NMC 622, which is obtained after charge/discharge, has similar or even lower degree of cation mixing than "normal" NMC 622 product. The refinement results also show the same conclusion. The percentage of Ni on Li for NMC E1p is 10.45% while it is 2.35% for NMC P4. There are almost five times more Ni on Li sites in NMC E1p. Thus, lithium deficient sintered precursor has a higher degree of cation mixing, which is quite distinguishable from the lithium deficient sample obtained during charge/discharge.

Example 2

A NMC powder having the formula $Li_{1.06}M_{0.94}O_2$ with $M=Ni_{0.55}(Ni_{1/2}Mn_{1/2})_{0.3}Co_{0.15}$ is manufactured at a large-scale from a lithium deficient sintered precursor through similar steps as in Example 1, except for certain sintering conditions, like the lithium to metal ratio and sintering temperature. The details are as follows:

1) Preparation of lithium deficient sintered precursor $Li_{0.8}(Ni_{0.55}(Ni_{1/2}Mn_{1/2})_{0.3}Co_{0.15})_{1.2}O_2$: 4 kg of $Li_2CO_3$ and MOOH with $M=Ni_{0.55}(Ni_{1/2}Mn_{1/2})_{0.3}Co_{0.15}$ are homogenously blended in a Henschel Mixer® for 30 mins. The blended power is sintered at 895° C. for 10 hours under dry air in a pilot-scale equipment. The dry air is continuously pumped through the sintering equipment at a flow of 40 L/min. After sintering, the sintered cake is crushed and ready for the second blending step. The products obtained from this step is the lithium deficient sintered precursor. The composition of this intermediate product is verified by an ICP test.

2) Preparation of NMC powder with the formula $Li_{1.06}[Ni_{0.55}(Ni_{1/2}Mn_{1/2})_{0.3}Co_{0.15}]_{0.94}O_2$: the lithium deficient sintered precursor obtained in step 1 is blended with 26 mol % LiOH to correct the Li stoichiometry in the intermediate product to the final target composition of $Li_{1.06}[Ni_{0.55}(Ni_{1/2}Mn_{1/2})_{0.3}Co_{0.15}]_{0.94}O_2$. The blending is done in a Henschel Mixer® for 30 mins. The mixture is then sintered at 830° C. for 10 hours under dry air in a pilot-scale equipment. The dry air is continuously pumped into the sintering equipment at a flow of 40 L/min. After sintering, the sintered cake is crushed, classified and sieved so as to obtain a non-agglomerate powder. The above-prepared NMC sample is labelled NMC E2, and the above prepared lithium deficient sintered precursor is labelled NMC E2p.

Counterexample 3

A NMC powder having the formula $Li_{1.06}M_{0.94}O_2$ with $M=Ni_{0.55}(Ni_{1/2}Mn_{1/2})_{0.3}Co_{0.15}$ is manufactured at a large-scale as explained in Example 2, except that the lithium deficient sintered precursor has an insufficient crystallinity, as it is prepared at a lower first sintering temperature of 850° C. This NMC sample is labelled NMC C3, and the lithium deficient sintered precursor of NMC C3 is labelled NMC C3p.

Counterexample 4

A NMC powder having the formula $Li_{1.06}M_{0.94}O_2$ with $M=Ni_{0.55}(Ni_{1/2}Mn_{1/2})_{0.3}Co_{0.15}$ is manufactured at a large-scale as explained in Example 2, except that the lithium deficient sintered precursor has a large crystallite size, as it is prepared at a higher first sintering temperature of 940° C. This NMC sample is labelled NMC C4, and the lithium deficient sintered precursor of NMC C4 is labelled NMC C4p.

Performance of Example 2, Counterexample 3 and Counterexample 4

Figure 7:
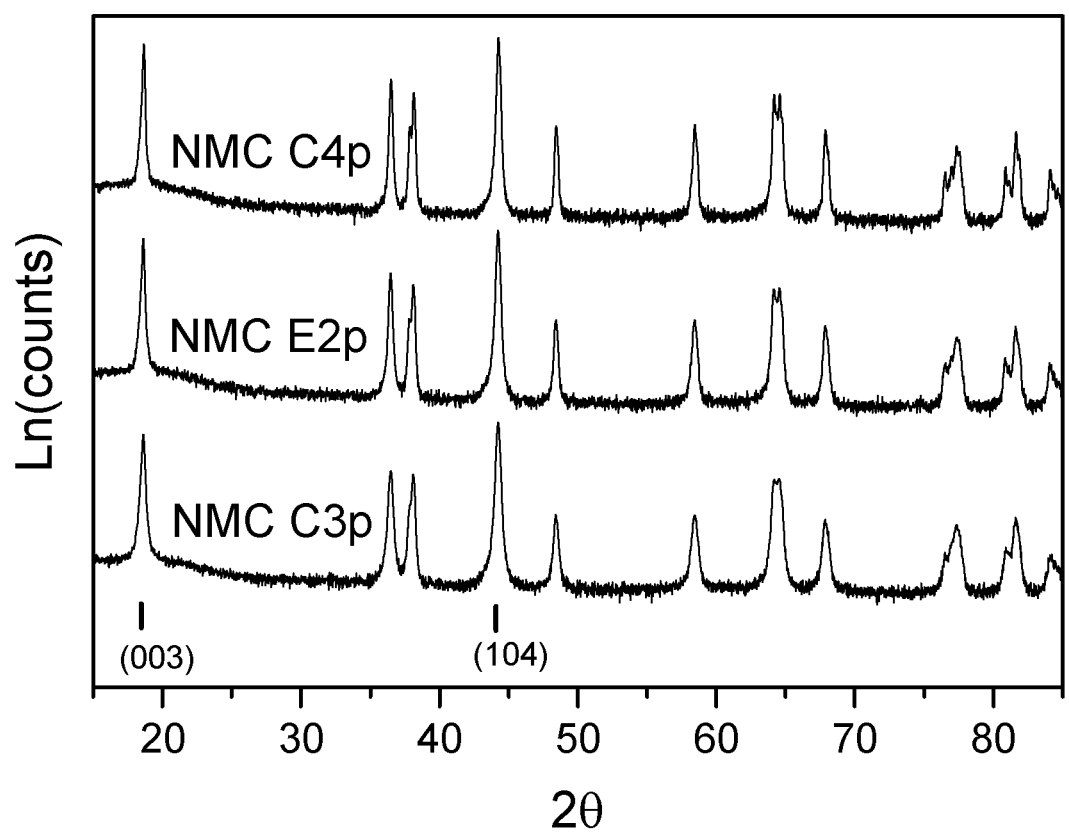
FIG. 7: XRD pattern of the intermediate of NMC 70:15:15 samples.

FIG. 7 shows the X-ray diffraction patterns of NMC C3p, NMC C4p and NMC E2p. These XRD patterns show single phases of NMC powder, without obvious impurities. In the Figure, the (003) and (104) diffraction peaks are indicated. These two peaks are chosen to calculate the crystalline size using the W-H method.

Figure 8:
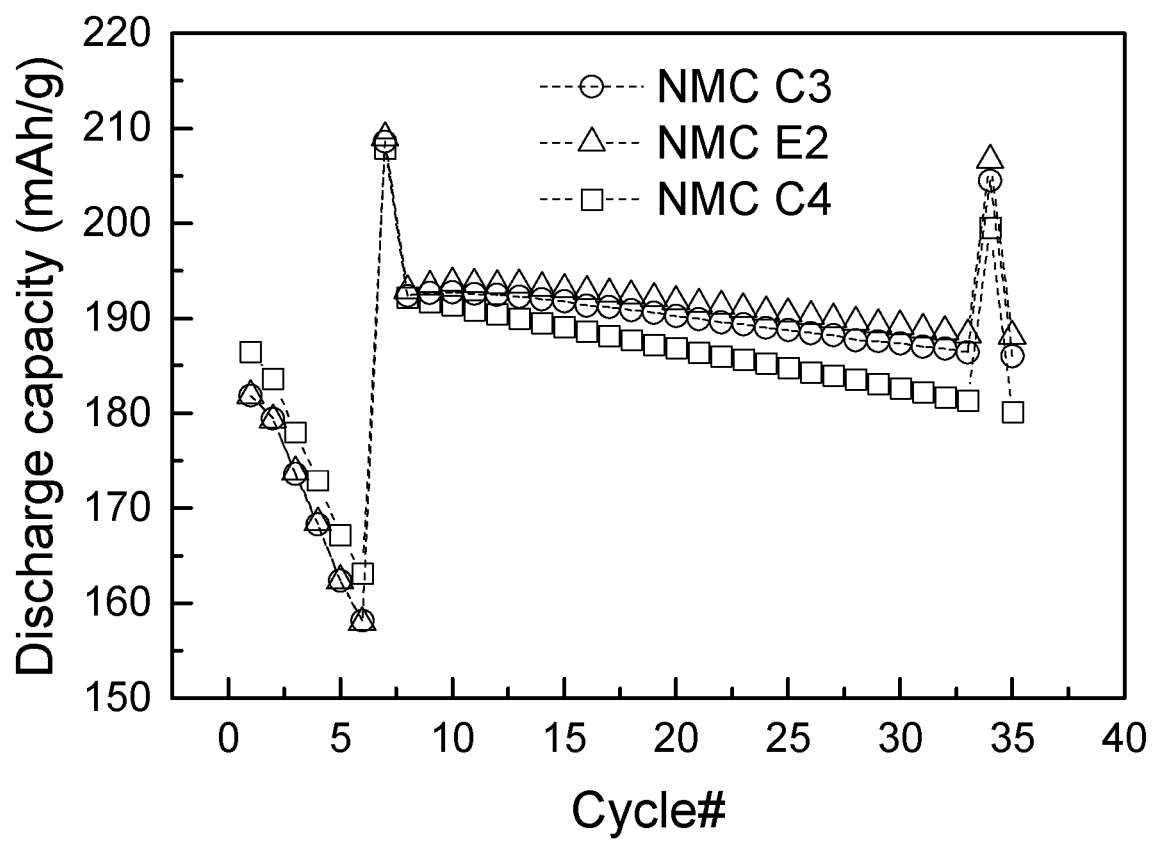
FIG. 8: Coin cell profile of NMC 70:15:15 samples.

FIG. 8 shows the coin cell results of the NMC C3, NMC E2 and NMC C4 samples, where the triangle symbol is for NMC E2, the circle symbol is for NMC C3 and the square symbol is for NMC C4. From the figure, it can be observed that the NMC E2 has the best cyclability, whilst NMC C4 has the worst. Table 6 summarizes the electrochemical performance, crystalline information and soluble base content of NMC E2, NMC C3 and NMC C4.

TABLE 6

Performance of Ex 2, CE3 and CE4

| Example ID | *Size (nm) | DQ0.1C (mAh/g) | Qfade0.1C (%/100) | Qfade1C (%/100) | Li$_2$CO$_3$ (wt %) |
|---|---|---|---|---|---|
| NMC E2 | 51.9 | 181.9 | 4.7 | 10.0 | 0.114 |
| NMC C3 | 37.1 | 181.7 | 7.0 | 12.5 | 0.429 |
| NMC C4 | 64.2 | 186.7 | 14.6 | 22.7 | 0.158 |

*The crystalline size L of intermediate products.

As all the samples are prepared using the double firing method, the sole difference among them is the crystallinity of the lithium deficient sintered precursor used for the 2$^{nd}$ firing. The different sinter temperature during the 1$^{st}$ cook results in a variation of crystalline size and lattice strain of the lithium deficient precursors. For the highest sintering temperature, NMC C4p has a relatively large crystalline size of 64.2 nm. When decreasing the sintering temperature by around 45° C., NMC E2p is obtained with a smaller crystalline size of 51.9 nm. When the sintering temperature goes further down by 45° C., the crystalline size of NMC C3p is 37.1 nm. According to the invention, for z=0.55, 40.15≤L≤60.15. It is clear that the crystalline size of the intermediate decreases when the sintering temperature is lower, however, the lithium carbonate content does not follow the same trend, as was already observed in Examples 1, CE2 and CE3.

Similar to the analysis in Ex 1, CE2 & CE3, the NMC powder has a bad cyclability when its lithium carbonate content is too high, like for NMC C3. Once again, it is also observed that when the lithium deficient sintered precursor has a too high crystallinity, the final NMC product made from such precursor exhibits a bad cyclability, like for NMC C4. Even though the lithium carbonate content in NMC C4 is low, the cycle stability deteriorates due to the over-sintered lithium deficient intermediate.

Thus, there is an optimum range of crystalline size of intermediate for obtaining high Ni-excess (Ni-excess=0.55) NMC powder having a good cyclability in a battery. When the crystalline size of the lithium deficient sintered precursor is too high, like in the case of NMC C4p, the cycle stability is negatively affected. When the crystalline size of intermediate is too low, like in the case of NMC C3p, the lithium carbonate content in the final product would be too high to obtain a good cyclability. Thus, in order to obtain a NMC powder (Ni-excess=0.55) with good cyclability made by the double firing method according to the invention, the sintering conditions have to be adjusted to make sure that the crystalline size of the lithium deficient precursor is within the optimum range.

Figure 9:
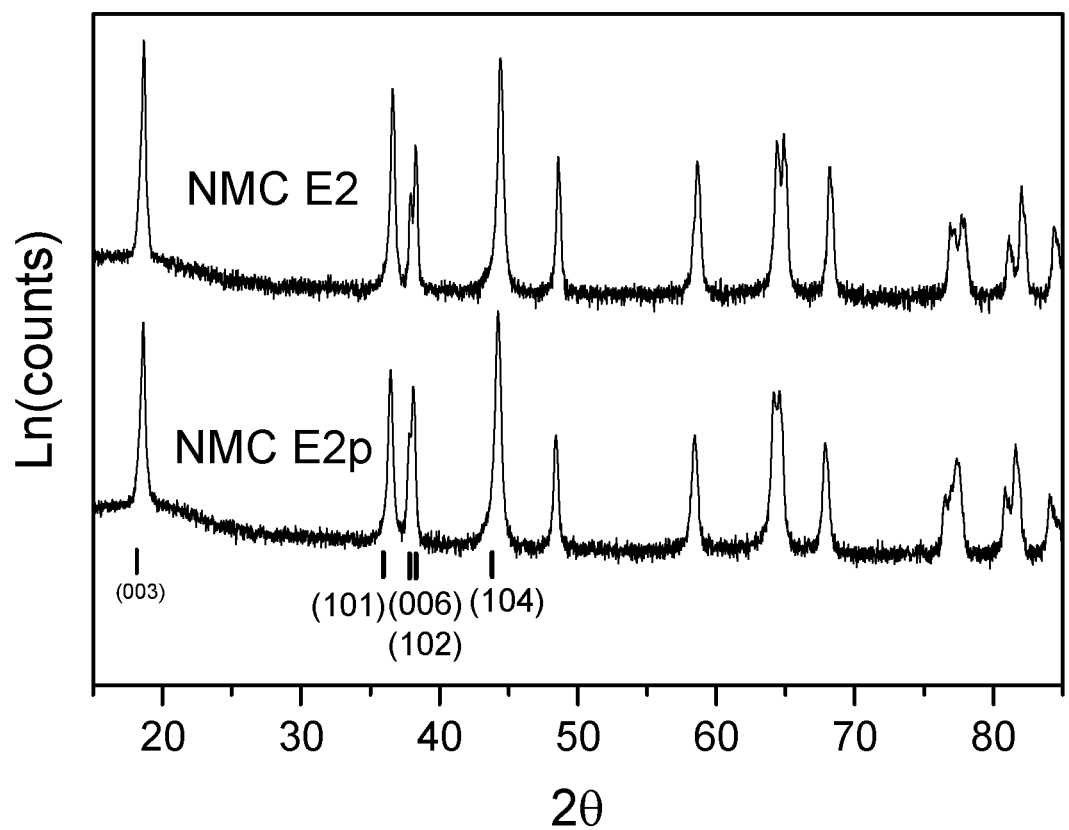
FIG. 9: XRD pattern of the intermediate and final product of NMC 70:15:15 samples.

Finally, as was discussed before, the lithium deficient sintered precursor (NMC E1p) showed a different result of cation mixing when compared with the final product (NMC E1). This phenomenon is also observed in Example 2. FIG. 9 shows the XRD pattern of the NMC E2p and NMC E2 samples. The Bragg peaks (103), (101), (104) and doublet peak (006, 102) are indicated. Based on the intensity of these peaks, Table 7 summarizes the ratio of I003/I104 and R factor of NMC E2p and NMC E2 samples.

TABLE 7

I003/I104 ratio and R factor of Ex 2.

| Sample | I003/I104 | R factor |
|---|---|---|
| NMC E2p | 0.69 | 0.87 |
| NMC E2 | 1.06 | 0.42 |

The ratio of I003/I104 reflects the degree of Li to transition metal disorder. A large value of I003/I104 indicates a small degree of distortion. Looking at the ratio I003/I104 of NMC E2p and NMC E2, it can be concluded that there is more cation mixing existing in NMC E2p and more Ni on the Li sites. The same observation can be made when comparing the R factor. The lithium deficient sintered precursor has a higher R factor by contrast to the final product. As discussed in Dahn's paper mentioned above, a high R factor means a high disordering of Li and transition metals. Thus, the higher value of R in NMC E2p confirms that there is a higher percentage of Ni on Li sites in the lithium deficient sintered precursor.

The invention claimed is:

1. A crystalline precursor compound for manufacturing a lithium transition metal based oxide powder usable as an active positive electrode material in lithium-ion batteries, the precursor having a general formula Li$_{1-a}$ ((Ni$_z$ (Ni$_{1/2}$ Mn$_{1/2}$)$_y$ Co$_x$)$_{1-k}$ A$_k$)$_{1+a}$ O$_2$, wherein x+y+z=1, 0.1≤x≤0.4, 0.40≤z≤0.55, A is a dopant, 0≤k≤0.1, and 0.10≤a≤0.25, wherein the precursor has a crystalline size L expressed in nm, with 77−(67*z)≤L≤97−(67*z).

2. The crystalline precursor compound of claim 1, having a Li$_2$CO$_3$ content <0.3 wt %.

3. The crystalline precursor compound of claim 1, having a general formula Li$_{1-a}$ ((Ni$_{0.4}$ (Ni$_{1/2}$ Mn$_{1/2}$)$_{0.4}$ Co$_{0.2}$)$_{1+a}$ O$_2$, with 0.10≤a≤0.20 and 55≤L≤65.

4. The crystalline precursor compound of claim 1, having a general formula Li$_{1-a}$ ((Ni$_{0.55}$ (Ni$_{1/2}$ Mn$_{1/2}$)$_{0.3}$ Co$_{0.15}$)$_{1+a}$ O$_2$, with 0.15≤a≤0.25 and 45≤L≤55.

5. A positive electrode material having a general formula Li$_{1+a'}$ ((Ni$_z$(Ni$_{1/2}$ Mn$_{1/2}$)$_y$ Co$_x$)$_{1-k}$ A$_k$)$_{1-a'}$O$_2$, wherein x+y+z=1, 0.1≤x≤0.4, 0.25≤z≤0.55, A is a dopant, 0≤k≤0.1, and 0.01≤a'≤0.10, wherein the positive electrode material is prepared from the precursor compound of claim 1, and wherein the positive electrode material has a ratio I003/I104 value greater than that of the precursor compound and an R value less than that of the precursor compound.

6. A method for preparing a positive electrode material having a general formula Li$_{1+a'}$ M$_{1-a'}$ O$_2$, with M=(Ni$_z$ (Ni$_{1/2}$ Mn$_{1/2}$)$_y$ Co$_x$)$_{1-k}$ A$_k$, wherein x+y+z=1, 0.1≤x≤0.4, 0.30≤z≤0.55, A is a dopant, 0≤k≤0.1, and 0.01≤a'≤0.10, comprising:

providing a M-based precursor prepared from co-precipitation of metal sulphates with a base;

mixing the M-based precursor with $Li_2CO_3$, thereby obtaining a first mixture, whereby the Li to transition metal ratio in the first mixture is between 0.50 and 0.90, sintering the first mixture in an oxidizing atmosphere at a temperature between 860 and 930° C., for a time between 8 and 36 hrs, thereby obtaining a lithium deficient precursor powder, mixing the lithium deficient precursor powder with either one of LiOH and $LiOH.H_2O$, thereby obtaining a second mixture, sintering the second mixture in an oxidizing atmosphere at a temperature between 800 and 1000° C., for a time between 6 and 36 hrs.

7. The method according to claim 6, wherein the lithium deficient precursor powder comprises a crystalline precursor compound having a general formula $Li_{1-a}((Ni_z(Ni_{1/2}Mn_{1/2})_y Co_x)_{1-k} A_k)_{1+a} O_2$, wherein $x+y+z=1$, $0.1 \le x \le 0.4$, $0.30 \le z \le 0.55$, A is a dopant, $0 \le k \le 0.1$, and $0.05 \le a \le 0.50$, wherein the precursor has a crystalline size L expressed in nm, with $77-(67*z) \le L \le 97-(67*z)$.

8. The method according to claim 6, wherein a Li to transition metal ratio in the first mixture is between 0.65 and 0.82.

9. The method according to claim 6, wherein $0.40 \le z \le 0.55$, and a Li to transition metal ratio in the first mixture is $((2-z)/1.88) \pm 0.05$.

10. The method according to claim 9, wherein the first mixture is sintered at a temperature between 880 and 920° C.

11. The method according to claim 9, wherein the second mixture is sintered at a temperature between 820 and 860° C., for a time between 8 and 12 hrs.

* * * * *